United States Patent
Yang

(10) Patent No.: US 7,122,144 B2
(45) Date of Patent: Oct. 17, 2006

(54) METHOD OF MAKING A WATER CONDUIT CONNECTOR FOR SPORTS WATER BAG

(76) Inventor: Shih-Sheng Yang, PO Box 82-114, Taipei (TW)

( * ) Notice: Subject to any disclaimer, the term of this patent is extended or adjusted under 35 U.S.C. 154(b) by 442 days.

(21) Appl. No.: 10/688,939

(22) Filed: Oct. 21, 2003

(65) Prior Publication Data

US 2005/0082719 A1    Apr. 21, 2005

(51) Int. Cl.
*B29C 45/14* (2006.01)
(52) U.S. Cl. .................. 264/278; 264/334; 264/335
(58) Field of Classification Search ........... 264/275, 264/278, 335, 334
See application file for complete search history.

(56) References Cited

U.S. PATENT DOCUMENTS

| | | | | |
|---|---|---|---|---|
| 2,561,351 | A * | 7/1951 | Wendell | 285/148.13 |
| 6,056,016 | A * | 5/2000 | Rogers | 138/98 |
| 6,099,975 | A * | 8/2000 | Peterson et al. | 428/596 |
| 6,557,721 | B1 * | 5/2003 | Yang | 220/713 |
| 6,698,716 | B1 * | 3/2004 | Yang | 251/288 |
| 6,742,681 | B1 * | 6/2004 | Yang | 222/509 |
| 6,783,115 | B1 * | 8/2004 | Yang | 251/342 |
| 6,805,826 | B1 * | 10/2004 | Coombs | 264/272.15 |

* cited by examiner

*Primary Examiner*—Edmund H. Lee
(74) *Attorney, Agent, or Firm*—Leong C. Lei

(57) ABSTRACT

An integral formation of a water conduit connector for sports water bags includes the following steps: 1) manufacturing molds, which comprises a hole allowing the core mold to go inside, a sprue, positioning holes, and top rejecting holes going through to the mold cave, inside of which is provided with threaded grooves and pipe neck portions; 2) disposing and positioning the water hose in the cave formed by the molds; 3) closing the molds and inserting a mobile core mold from the inlet into the molds, such that the core mold will stretch into the hose to serve as a padding for the interior wall of the hose; 4) injecting liquid hard plastic material from the sprue into the cave of the molds, such that a threaded connecting base can be integrally formed at the end of the hose; 5) detaching the molds; and 6) blowing high pressure air from the free end of the hose to force the core mold detaching from the interior wall of the hose, accordingly a firmly connected, integrally formed hose with a threaded connecting base is completed.

4 Claims, 6 Drawing Sheets

METHOD OF MAKING A WATER CONDUIT CONNECTOR FOR SPORTS WATER BAG

BACKGROUND OF THE INVENTION (a) Technical Field of the Invention

The present invention relates to an integral formation of a water conduit connector for sports water bags, which allow firm connection of the hose of soft plastic and the threaded connecting base of hard plastic, thereby the aforesaid two elements would not detatch from each other due to outer force, and the connected structure is particularly applicable to water bag for use in sport.

(b) Description of the Prior Art

Cyclists used to carry on back a water bag for supplying water during sport. Generally, said water bag is provided with a water pouch and a water conduit connecting thereto. A nozzle with the function of stopping water is provided at the end of the water conduit, such that when the cyclist is thirsty, he/she can pull out the conduit and suck the nozzle to drink water.

The relevant water bag structures are disclosed in, e.g. U.S. Pat. Nos. 5,727,714 and 5,806,726.

In U.S. Pat. No. 5,727,714, the conduit is connected to the water bag via a holding base, which is provided with a one-way tooth structure, such that the water conduit (hose) can be easily and flexibly mounted on the holding base. As the water hose made of soft plastic would deform due to elasticity fatigue. Therefore, after being repeatedly detached for wash, the connecting portion would deform and subsequently loose from the water hose. Usually the user would cut off the spoiled hose, which would gradually become shorter and shorter and finally useless.

In U.S. Pat. No. 5,806,726, the water hose is connected with the holding base via a threaded base. The advantage of such a connection is that the user can simply detach the whole structure is he/she intends to wash the interior wall of the water conduit, and that the water conduit can be cleaned completely without leaving any drink. This is quite sanitary. However, as adhesive is applied to fasten the water hose and the threaded base made of plastic of different hardness, it is harmful for the user's mouth to touch the adhesive constantly.

In view of the above-mentioned disadvantages in the prior art, the inventor has disclosed an integral formation of a water conduit connector for sports water bags, which has long life in use, harmless and firm combination in structure.

SUMMARY OF THE INVENTION

The primary object of the invention is to provide an integral formation of a water conduit connector for sports water bags, which need not be combined via adhesive, and conforms the sanitation requirement.

The second object of the invention is to provide a threaded connecting base, which is firmly connected with the water conduit, such that the noble of the sports water bag can be easily detached for wash and assembled for use again. The interior wall of the water conduit can be smooth without leaving any impurities.

To obtain the above objects, the invention includes the following steps:

1) manufacturing molds, which comprises a hole allowing the core mold to go inside, a sprue, positioning holes, and top rejecting holes going through to the mold cave, inside of which is provided with threaded grooves and pipe neck portions;

2) disposing and positioning the water hose in the cave formed by the molds;

3) losing the molds and inserting positioning pins through the positioning holes into the molds for holding the head of the conduit (hose), which is fastened by way of the clamp of molds on the pipe neck of the hose; a mobile core mold is subsequently inserted from the inlet into the molds, such that the core mold will stretch an appropriate distance into the hose to serve as a padding for the interior wall of the hose;

4) injecting liquid hard plastic material from the sprue into the cave of the molds, such that a threaded connecting base can be integrally formed at the end of the hose;

5) detaching the molds by way of inserting a pin from the top rejecting holes and separating the hose integrally formed with the threaded connecting base from the molds; and 6) blowing high pressure air from the free end of the hose to force the core mold detaching from the interior wall of the hose, accordingly a firmly connected, integrally formed hose with a threaded connecting base is completed.

By way of the above steps, the integrally formed threaded connecting base and water hose made of plastic materials of different hardness can firmly combined without departing from each other due to the bite by a user. Besides, the interior wall of the water hose can be thoroughly cleaned to present a smooth surface without leaving any impurities.

To completely appreciate these and other objects of the present invention as well as the invention itself, all of which will become apparent to those skilled in the art, the following detailed description of the invention and the claims should be read in conjunction with the accompanying drawings.

DETAILED DESCRIPTION OF PREFERRED EMBODIMENT

Figure 1:
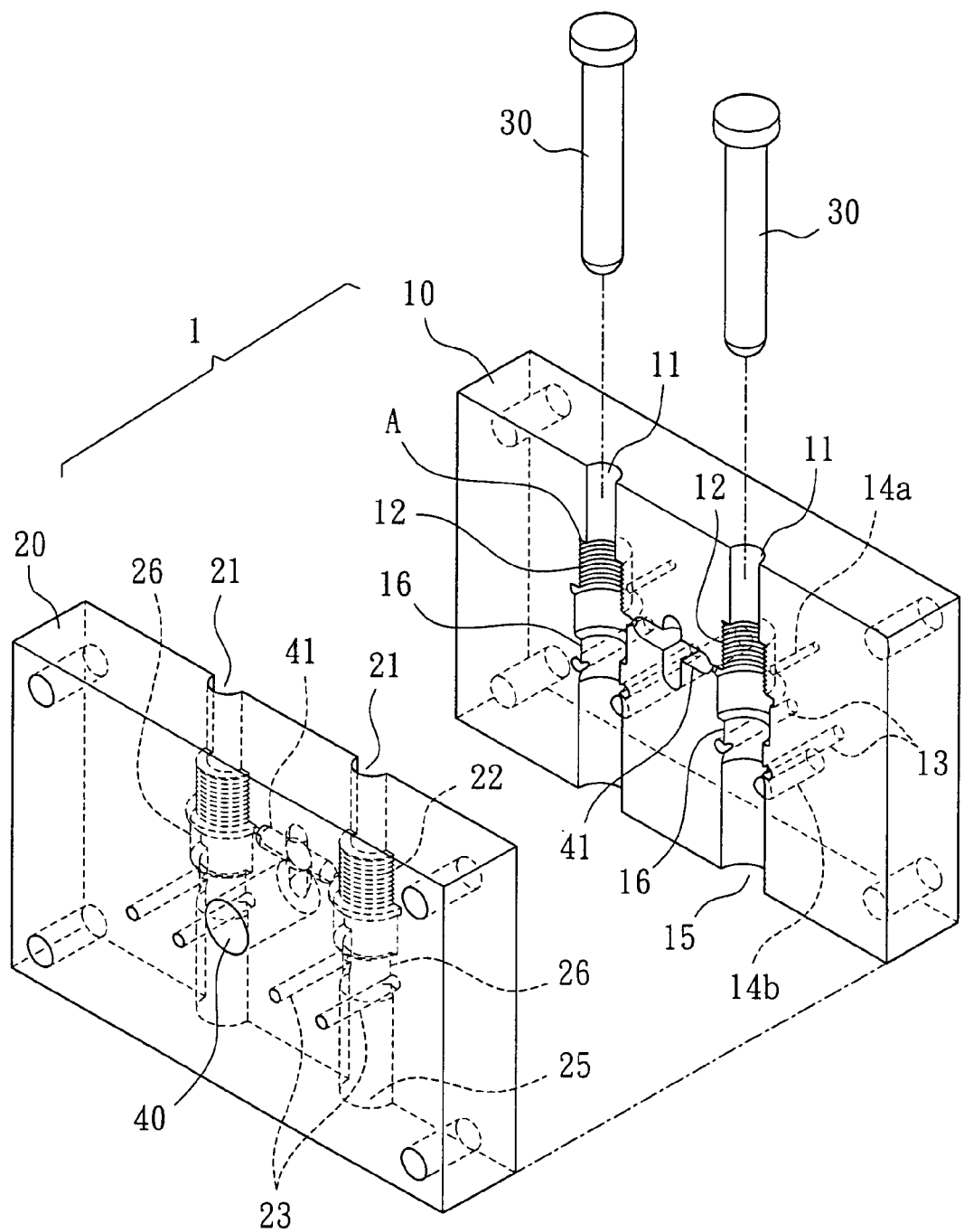
FIG. 1 is a perspective view of the molds according to the invention.
Figure 3:
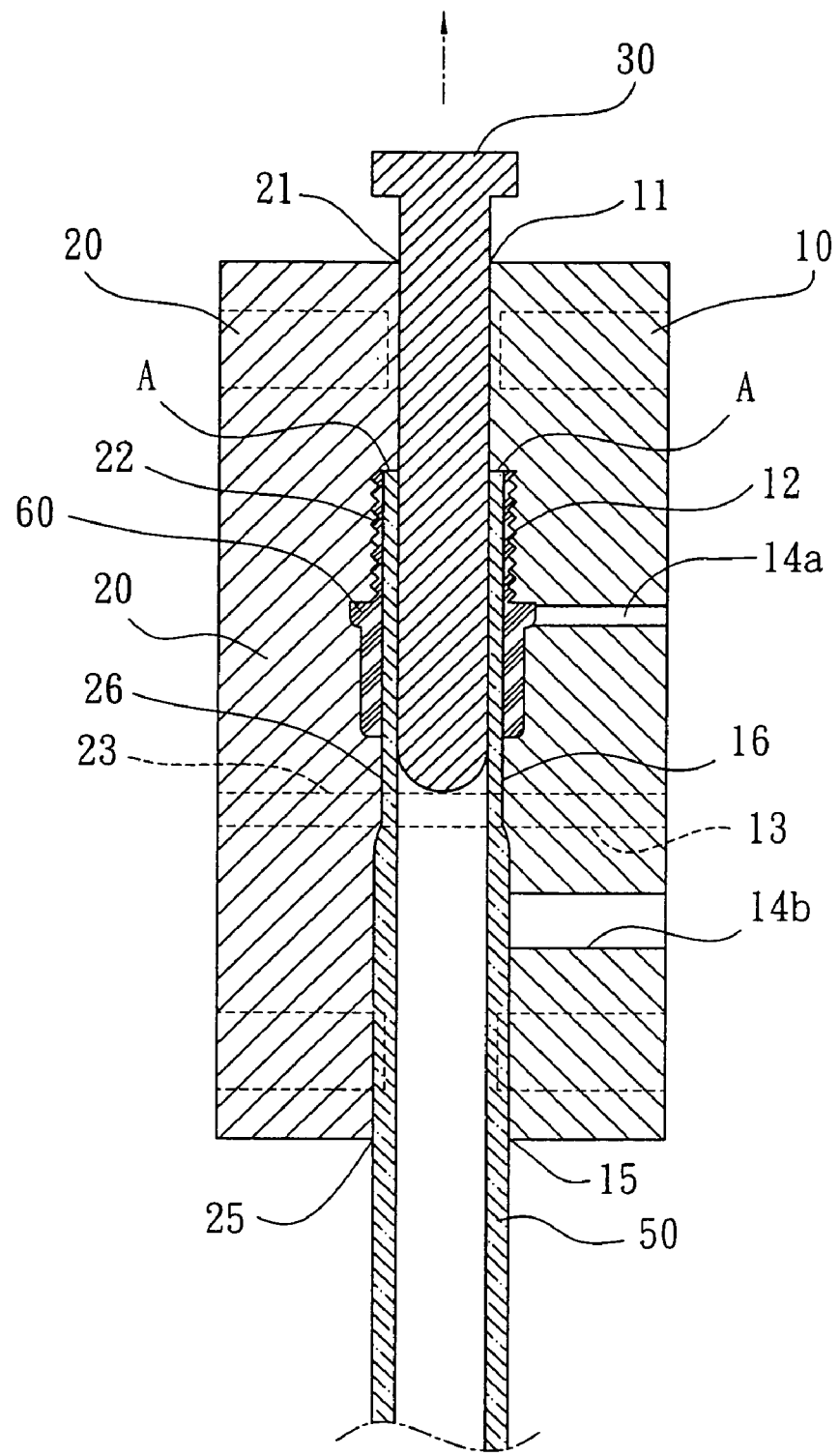
FIG. 3 is a perspective view of the invention when completing the plastic injection step.

As shown in the relevant figures, the invention includes the following steps:

1) manufacturing molds 1, which includes a right mold 10 and a left mold 20;

Half holes 11 are provided on the right mold 10 for receiving mobile core molds 30. Each cavity provided on the mold 10 includes a threaded groove 12, a conduit inlet 15 and a pipe neck portion 16, which has a smaller internal diameter than that of the conduit inlet 15, such that when the hose 50 (as shown in FIG. 3) is inserted along the conduit inlet 15 into the mold 10, it can be held by the pipe neck portion 16. The two positioning holes 13 are provided at the sides of the pipe neck portion 16 and can receive positioning bars (not shown) freely. So that when the core mold 30 is inserted into the conduit, the positioning bars can hold the top head of the conduit to prevent it from drawing back. A threaded base top rejecting hole 14a and a conduit top rejecting hole 14b go from outside into the mold cavity, while a flow way 41 goes through to the sides of the threaded grooves 12. Likewise, half holes 21 are provided on the left mold 20 for receiving mobile core molds 30. Each cavity provided on the mold 20 includes a threaded groove 22, two positioning holes 23, a conduit inlet 25 and a pipe neck portion 26, such that the cavity in-between the two molds (10, 20) would be in form of a tube hollow. A sprue 40 goes from the molds through to outside, so that plastic material can be injected via high pressure from the sprue 40 into the molds to integrally form a threaded connecting base 60 in the position where threaded grooves (12, 22) are (as shown in FIG. 1).

Figure 2:
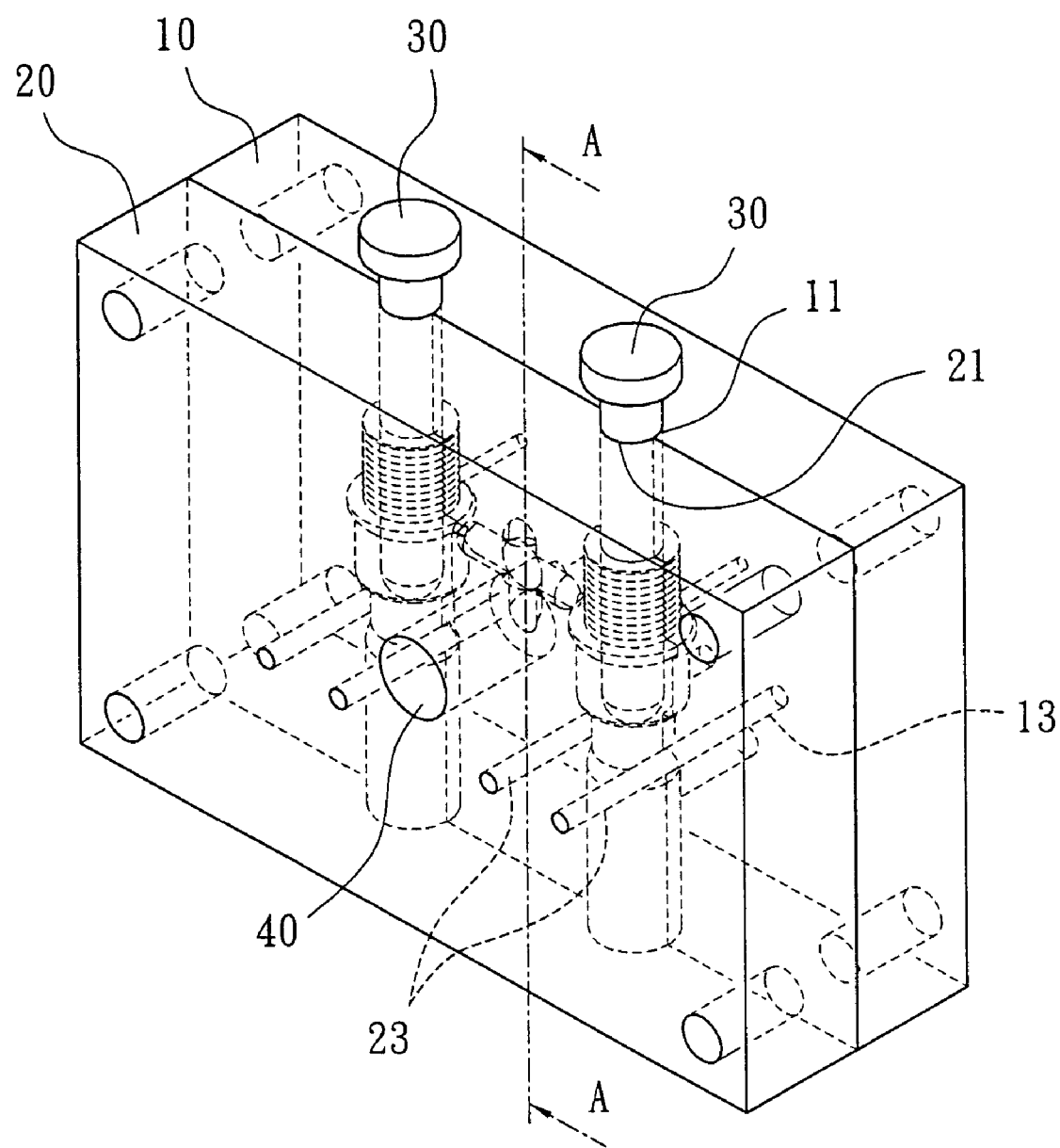
FIG. 2 shows the molds in a closing status.

2) disposing the water hose 50 into the conduit inlet 15, such that the end of the water hose can be against on the stepped surface of the threaded groove 12; When the right mold 10 and the left mold 20 are closed, there would be no space in-between the water hose 50 and the pipe neck portions (16, 26). Two positioning bar (not shown) can be inserted into the positioning holes 13 on the molds to clamp and position the head end of the hose 50 (as shown in FIG. 2).

Figure 4:
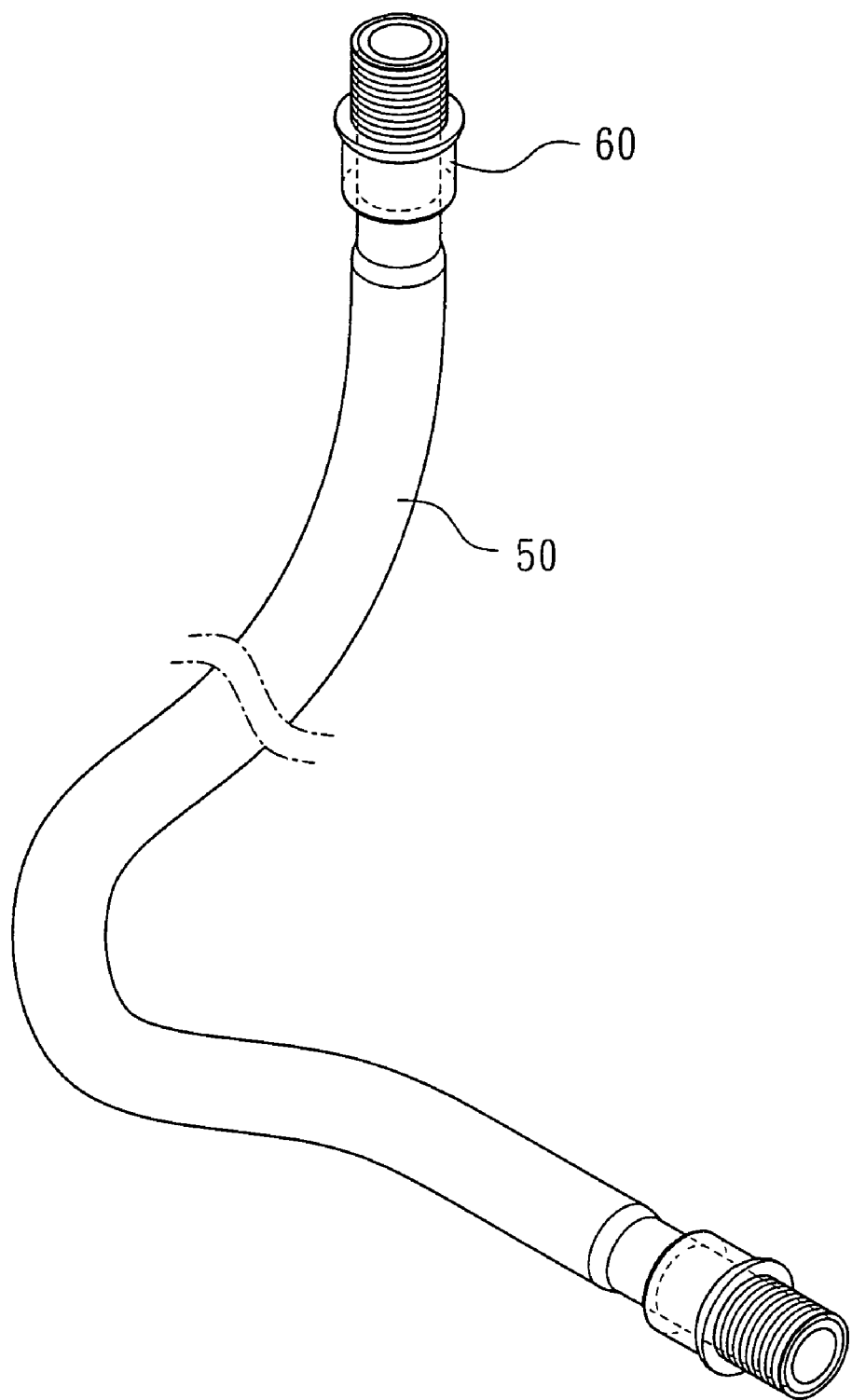
FIG. 4 is a perspective view showing the connection of the threaded connecting base with the conduit.
Figure 6:
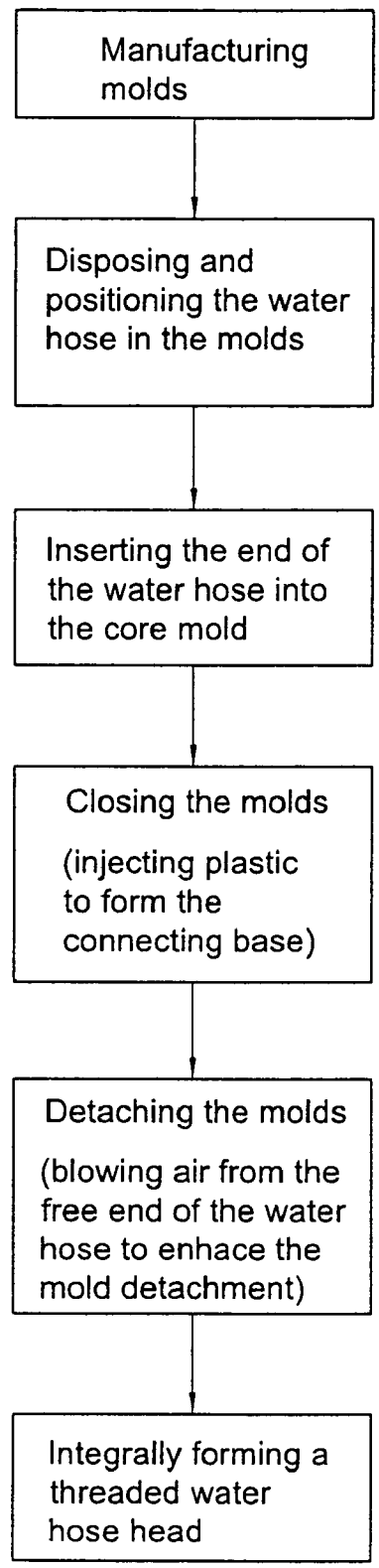
FIG. 6 is a flow chart of the manufacturing steps according to the invention.

3) inserting the mobile core molds 30 into the inlets formed by holes 11, 21, such that the core molds 30 can stretch an appropriate distance into the hose 50 to serve as a padding of the interior wall of the hose (as shown in FIG. 3);

4) injecting plastic solution from the sprue 40 into the cave of the molds to integrally form a threaded connecting base 60 (as shown in FIG. 6) on the outer wall of the hose 50 at the position where the threaded grooves (12, 22) are;

5) detaching the molds 10, 20 by way of inserting a rejecting pin into the top rejecting holes 14a, 14b to separate the hose with the threaded connecting base from the mold cave; and 6) blowing high pressure air from the free end of the hose to force the core mold detaching from the interior wall of the hose 50, accordingly a firmly connected, integrally formed hose 50 with a threaded connecting base 60 is completed (as shown in FIG. 4).

Figure 5:
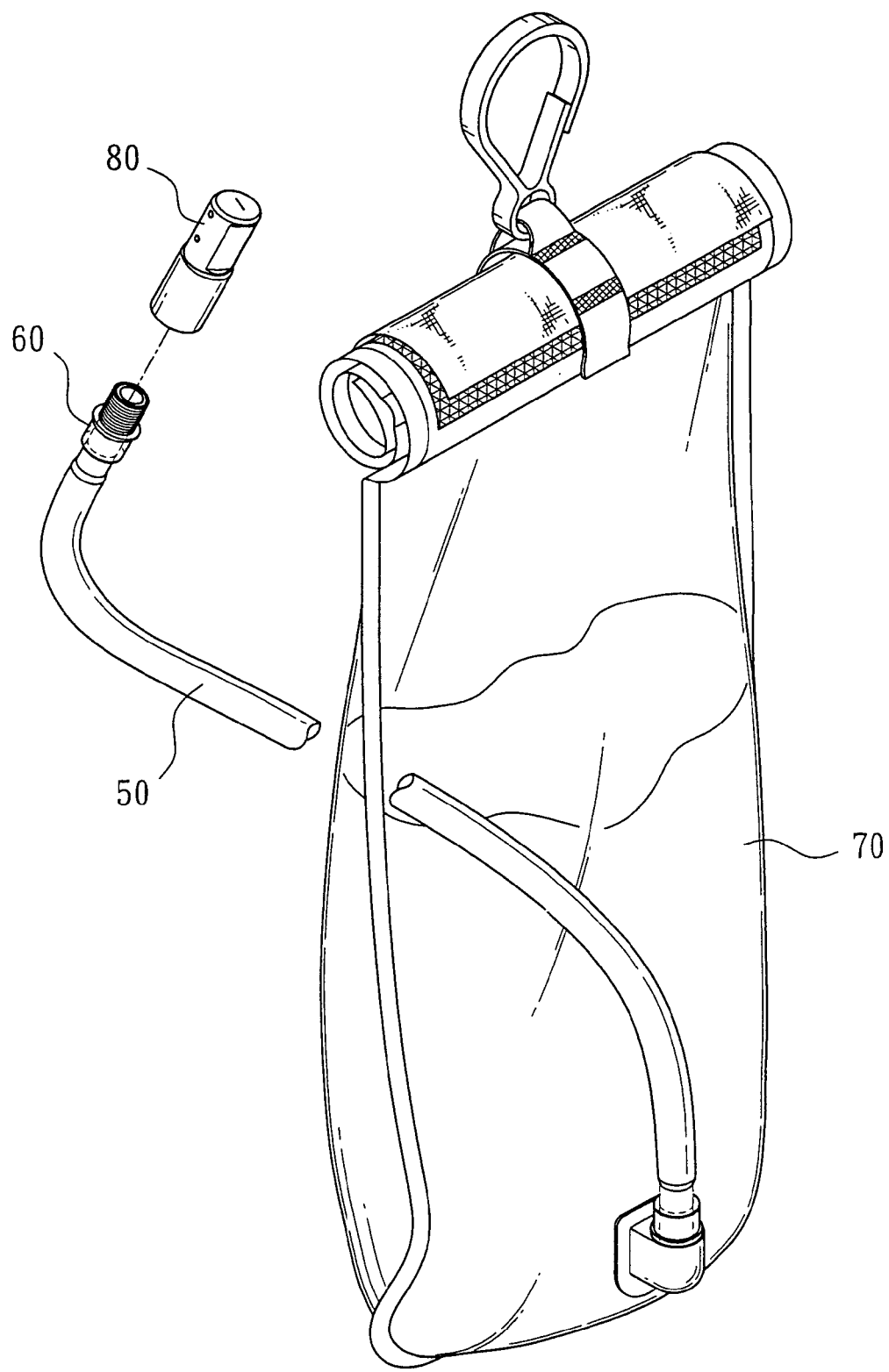
FIG. 5 shows applying the invention to the water bag and the nozzle.

Further referring to FIGS. 5 and 6, by way of the above processes, an integrally formed threaded connecting base 60 can be connected to an end of a plastic hose 50. The threaded connecting base can be applied to a lot of related products, such as in-between a sports water bag 70 and a nozzle 80 to ease the user to use and detach for cleaning.

In view of the above, the water hose structure with the integrally formed threaded connecting base made according to the invention has the following utilities and advantages:

1) By way of the connection of injected plastic of different hardness, the water conduit of soft plastic can have excellent curvature, while the threaded connecting base of hard plastic can make the water bag and the nozzle easily combined for use and instantly detached for cleaning.

2) As the threaded connecting base is formed integrally with the water hose, instead of connecting with each other via adhesive as used in the prior art, the invention would not engender any harm to the user's mouth.

3) As the threaded connecting base is firmed combined with the water hose, the integral construction can be detached for wash constantly without being damaged.

Although specific embodiments have been illustrated and described, it will be obvious to those skilled in the art that various modifications may be made without departing from what is intended to be limited solely by the appended claims.

Concluded the above, the invention discloses an integral formation of a water conduit connector for sports water bag and the products. The invention has improved the disadvantage in adhesive connection according to the prior art and provided a process for easily and firmly combining the threaded connecting base with the water hose. The invention is novel and rich of commercial value as claimed by the inventor.

I claim:

1. A method of making a water conduit connector for a sports water bag, comprising steps of:
   a. providing a mold which comprises a hole allowing a mobile core mold to go inside, a sprue, positioning holes, and a top rejecting hole going through to a mold cavity, inside of which is provided with threaded grooves and a pipe neck portion;
   b. disposing and positioning a water hose in the cavity formed by the mold;
   c. closing the mold and inserting positioning pins through the positioning holes into the mold for holding a head of the hose, which is fastened by way of the clamp of molds on the pipe neck of the hose; a mobile core mold being subsequently inserted from an inlet into the mold, such that the core mold will stretch a distance into the hose to serve as a padding for an interior wall of the hose;
   d. injecting liquid hard plastic material from the sprue into the cavity of the mold, such that a threaded connecting base can be integrally formed at an end of the hose;
   e. detaching the mold by way of inserting a pin info the top rejecting holes and separating the hose integrally formed with a threaded connecting base from the mold; and
   f. blowing high pressure air info a free end of the hose to force the core mold to detach from the interior wall of the hose thereby obtaining a firmly connected, integrally formed hose with a threaded connecting base.

2. The meted of making a water conduit connector for a sports water bag according to claim 1, wherein no space exists in-between the pipe neck portion and the hose.

3. The method of making a water conduit connector for a sports water bag according to claim 1, wherein a stepped surface is provided on a top of the threaded grooves of the mold.

4. The method of making a water conduit connector for a sports water bag according to claim 1, wherein the top rejecting hole going through to the cavity of the mold includes a threaded base top rejecting hole and a conduit top rejection hole.

* * * * *